April 5, 1955  H. C. JOHNSON  2,705,452
FRUIT JUICERS

Filed April 1, 1949  6 Sheets-Sheet 1

INVENTOR.
Herbert C. Johnson,
BY
Fidler, Crouse & Beardsley
Attys.

April 5, 1955    H. C. JOHNSON    2,705,452
FRUIT JUICERS

Filed April 1, 1949    6 Sheets-Sheet 2

INVENTOR.
Herbert C. Johnson,
BY
Fidler, Crouse & Beardsley
Attys.

April 5, 1955 H. C. JOHNSON 2,705,452
FRUIT JUICERS

Filed April 1, 1949 6 Sheets-Sheet 3

INVENTOR.
Herbert C. Johnson,
BY
Fidler, Crouse & Beardsley
Attys

April 5, 1955  H. C. JOHNSON  2,705,452
FRUIT JUICERS
Filed April 1, 1949  6 Sheets-Sheet 4
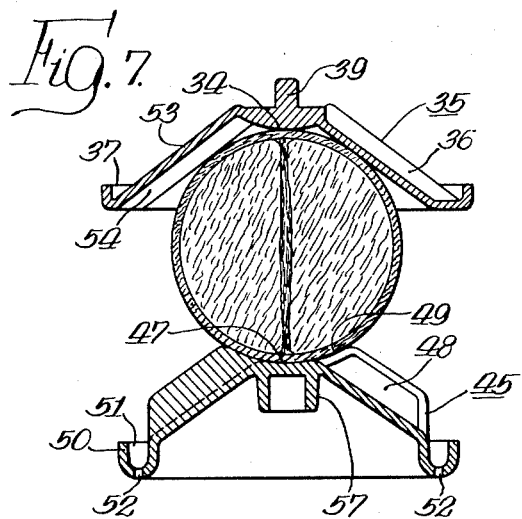
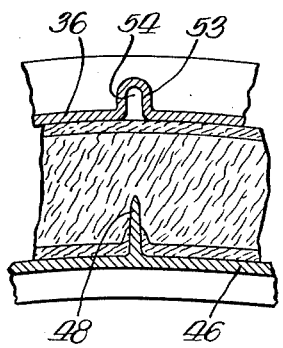
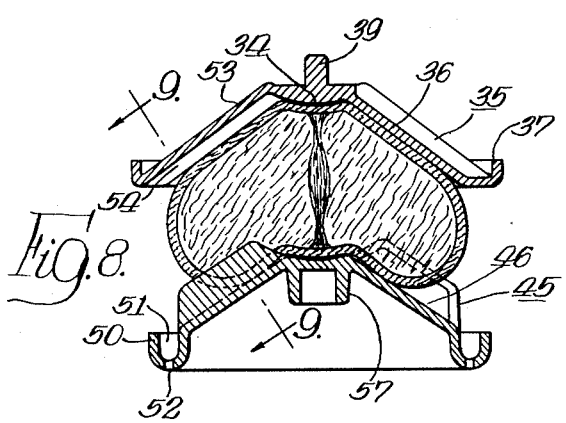
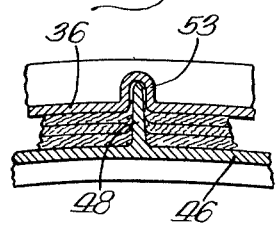
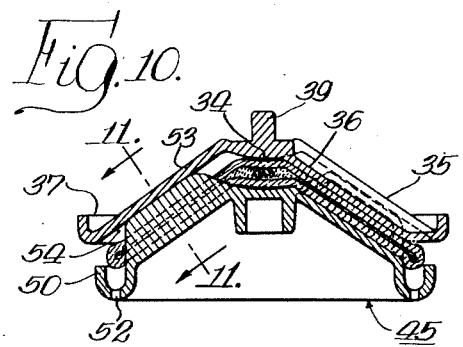
INVENTOR.
Herbert C. Johnson,
BY
Fidler, Crouse & Beardsley
Attys.

April 5, 1955   H. C. JOHNSON   2,705,452
FRUIT JUICERS
Filed April 1, 1949   6 Sheets-Sheet 5
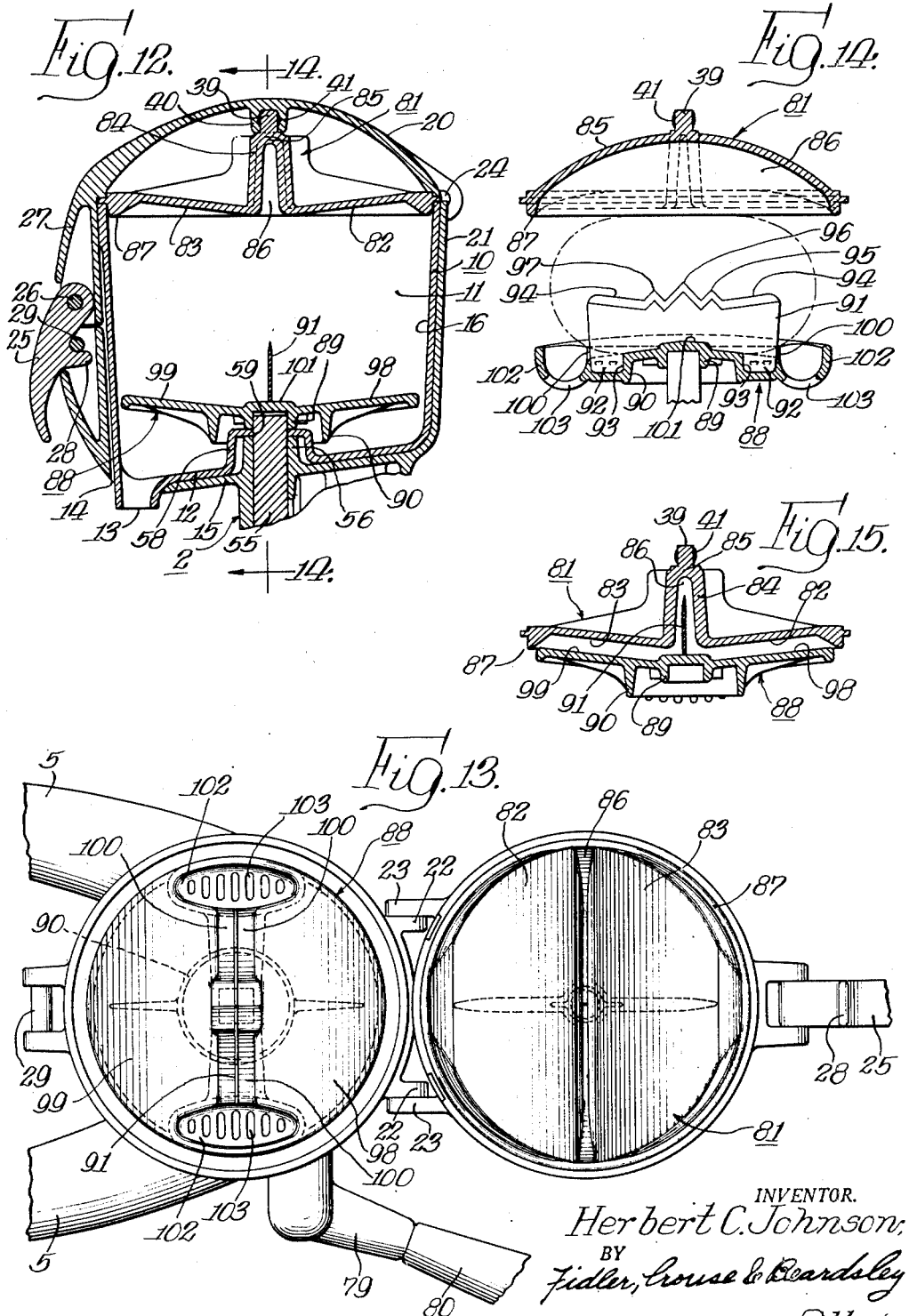
INVENTOR.
Herbert C. Johnson,
BY Fidler, Crouse & Beardsley
Attys.

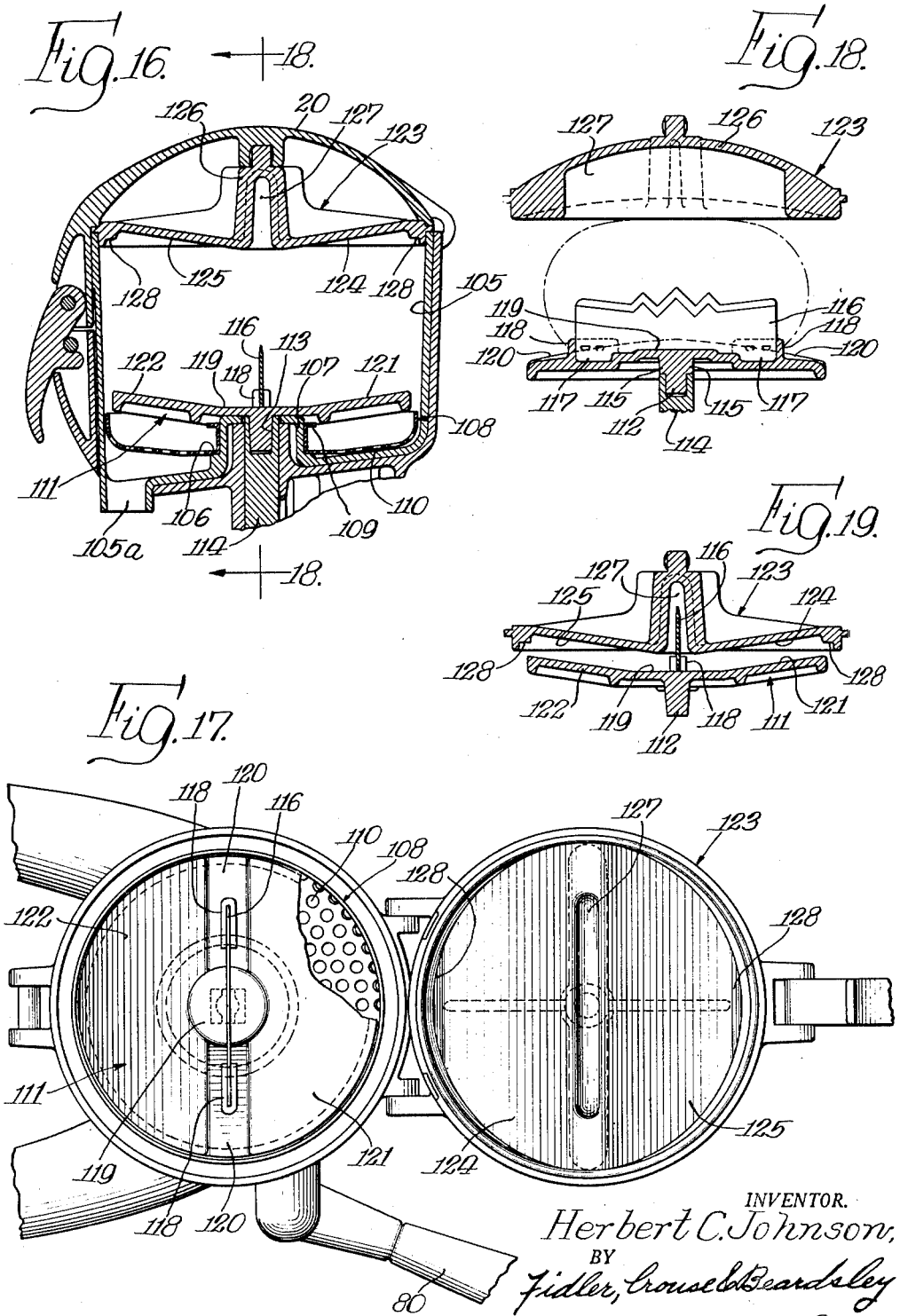

United States Patent Office 2,705,452
Patented Apr. 5, 1955

2,705,452

FRUIT JUICERS

Herbert C. Johnson, Wilmette, Ill.

Application April 1, 1949, Serial No. 84,861

10 Claims. (Cl. 100—98)

My invention relates to fruit juicers and more particularly to fruit juicers of the type which are adapted to squeeze whole fruit.

This application is a continuation-in-part of my copending application, Serial No. 738,289, filed March 31, 1947, for "Fruit Juicers," now abandoned.

An object of my invention is to provide an improved fruit juicer capable of rapidly expressing substantially all of the juice from a whole fruit by a simple manual operation.

Another object is to provide a fruit juicer wherein the skin of the fruit is cut in a predetermined manner at the beginning of the squeezing operation to permit the juice to flow from the fruit freely and to prevent bursting or rupturing of the skin and thus minimize the escape of pulp and seeds from the skin along with the expressed juice.

Another object is to provide a juicer wherein the juice is removed from the fruit with a minimum of crushing or bruising of the skin of the fruit, thus minimizing the release and escape of the natural oils or other unpalatable constituents from the skin.

Another object is the provision of a juicer in which the seeds and coarser elements of the pulp are effectively trapped and prevented from being withdrawn from the juicer with the expressed juice.

A further object is to provide a fruit juicer in which the fruit is substantially enclosed during the squeezing operation so that no juice is permitted to squirt from the juicer during the squeezing operation or to drip onto the exterior when the juicer is opened to remove the squeezed fruit residue, and the exterior of the juicer therefore may be maintained in a sanitary and neat appearing condition.

A further object is to provide a manually operable fruit juicer which may be made relatively low and compact and which at the same time is capable of effecting substantially complete removal of juice from the fruit with the application of only a moderate force on the actuating handle.

Still another object is to provide an improved whole fruit juicer wherein a complete squeezing operation may be effected by rotation of an actuating handle through less than one complete revolution, thereby providing what may be termed a "single stroke" operation.

Another object is to provide a fruit juicer in which the fruit juices are prevented from contacting the actuating mechanism or other parts of the juicer which might be detrimentally affected by the juice.

Still another object is the provision of a fruit juicer in which all parts normally soiled by juices during operation are readily accessible or removable for cleaning.

Another object is the provision of a simple and rugged structure, which may be inexpensively manufactured, and which will last almost indefinitely under normal conditions of use.

An additional object is to provide an improved whole fruit juicer wherein the rind of the fruit is cleanly cut along the bottom of the fruit and then the fruit is pressed between parallel disposed squeezer surfaces to express the juice from the fruit without subjecting the rind to crushing pressures.

Another object is the provision of a whole fruit juicer in which the lower squeezer surfaces are generally in relative V relation with an upstanding cutting blade disposed along the bottom of the V and the upper squeezer surfaces are disposed parallel with the respective floor squeezer surfaces so that when the fruit is cut by the blade and is squeezed between the respective parallel squeezer surfaces the juice will flow under the urge of gravity toward the bottom of the V and along the cutting blade so that the sides of the blade cooperate with the cut portion of the fruit in such a manner as to strain the juice and substantially retain all of the seeds and pulp within the fruit.

Other objects are to provide a whole fruit juicer wherein a squeezer member which supports the fruit is movable upwardly through a relatively short distance to squeeze the fruit against a fixedly mounted but removable head; wherein actuating or driving mechanism for a squeezer member is located close to the axis of movement thereof thus minimizing bending stresses on the juicer; wherein one of two opposing squeezer members is mounted for movement in a cup forming a squeezer chamber and another squeezer member is mounted for movement between a position closing the open end of the cup and in opposition to the movable squeezer member and a position away from the open end of the cup and permitting the insertion of fruit into the cup; wherein one of two opposing squeezer members is provided with cutting blades arranged to cut the skin of the fruit progressively in radially outward directions as the fruit is squeezed; wherein a single unitary member serves as a fruit support, cutter, squeezer and strainer; wherein one of the squeezer members serves as a shield to prevent the entry of juice into the actuating mechanism; wherein substantially all of the actuating mechanism is housed within the support for the member which defines the squeezer chamber wherein it is protected against dirt and fruit juices and is hidden from view; and wherein the structure is of such form that a member of the major members may be made readily by die casting.

Other objects and advantages of the invention will appear upon reference to the following description and to the accompanying drawings in which:

Fig. 7 is a fragmentary and somewhat diagrammatic view of one form of squeezer members only, taken along the line 7—7 of Fig. 4 and showing the squeezer members in their positions at the beginning of the squeezing stroke and with a fruit interposed between the squeezer members;

Fig. 8 is a view similar to Fig. 7 only showing the squeezer members illustrated in Fig. 7 in their positions at an intermediate stage of the squeezing stroke;

Fig. 9 is a slightly enlarged fragmentary view of cross section taken along line 9—9 of Fig. 8;

Fig. 10 is a view similar to Fig. 7 only showing the squeezer members illustrated in Fig. 7 in their positions at the end of the squeezing stroke;

Fig. 11 is a slightly enlarged, fragmentary cross-sectional view taken along line 11—11 of Fig. 10;

Fig. 12 is a fragmentary vertical section of a device generally similar to that of Figs. 1 to 6 inclusive but embodying another form of upper and lower squeezer members;

Fig. 13 is a fragmentary top plan view of the device shown in Fig. 2 with the cover or cap in open position and showing the cooperating surfaces of the form of squeezer members illustrated in Fig. 12;

Fig. 14 is a fragmentary and somewhat diagrammatic view of the squeezer members only, taken along the line 14—14 of Fig. 12 and showing the squeezer members in an intermediate stage of the squeezing stroke and with a fruit interposed between the squeezer members;

Fig. 15 is a view generally similar to Fig. 14, except that the squeezer members of Fig. 14 are shown rotated 90° on their axis and are in their respective positions at the approximate end of the squeezing stroke when a fruit is not interposed therebetween;

Fig. 16 is a vertical sectional view similar to Fig. 12 only showing the device with still another form of upper and lower squeezer members;

Fig. 17 is a fragmentary top plan view of the device shown in Fig. 16 with the cover or cap in open position and showing a plan view of the cooperating squeezer surfaces of the squeezer members;

Fig. 18 is a fragmentary and somewhat diagrammatic view of the squeezer members only, taken along the line 18—18 of Fig. 16 and showing the squeezer members in an intermediate stage of the squeezing stroke and with a fruit interposed between the squeezer members; and Fig. 19 is a view generally similar to Fig. 18, except that the squeezer members of Fig. 18 are shown rotated 90° on their common axis and are in their respective positions at the approximate end of the squeezing stroke when a fruit is not interposed therebetween.

Figure 1:
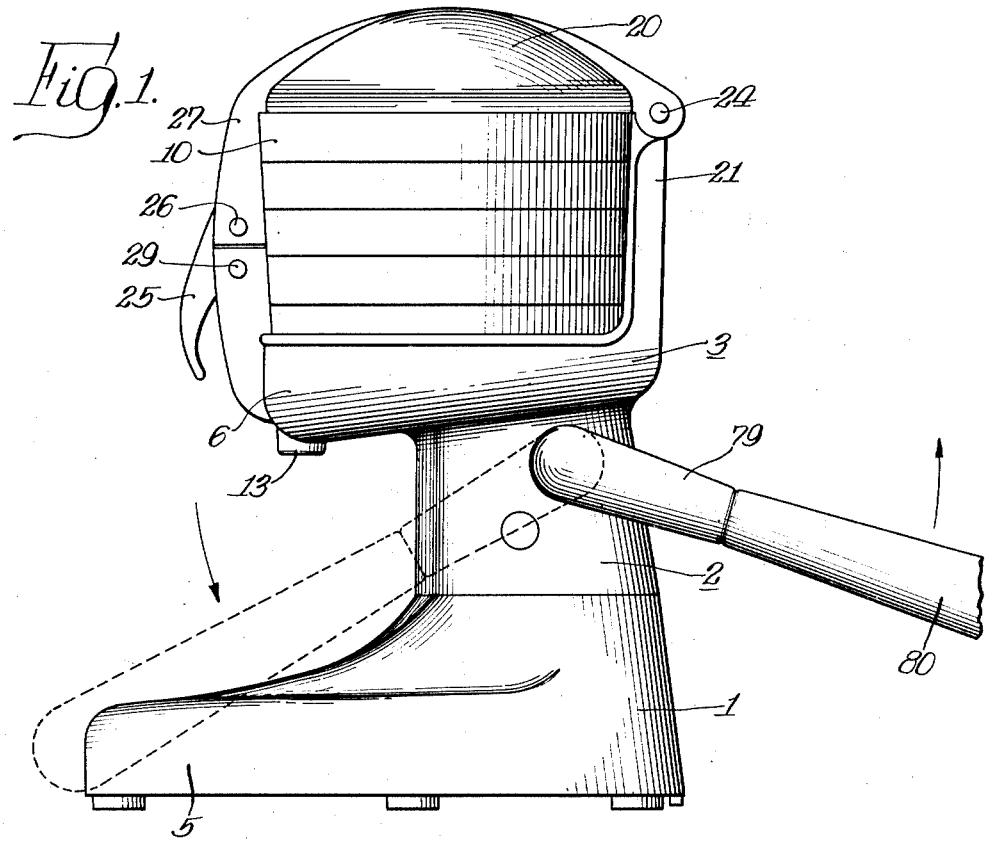
Figure 1 is a side elevational view of one embodiment of the invention.
Figure 2:
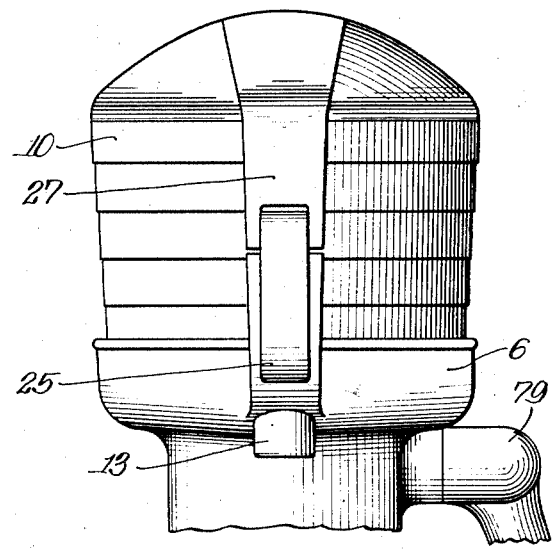
Fig. 2 is a fragmentary, front elevational view showing particularly the top portion of the device.
Figure 5:
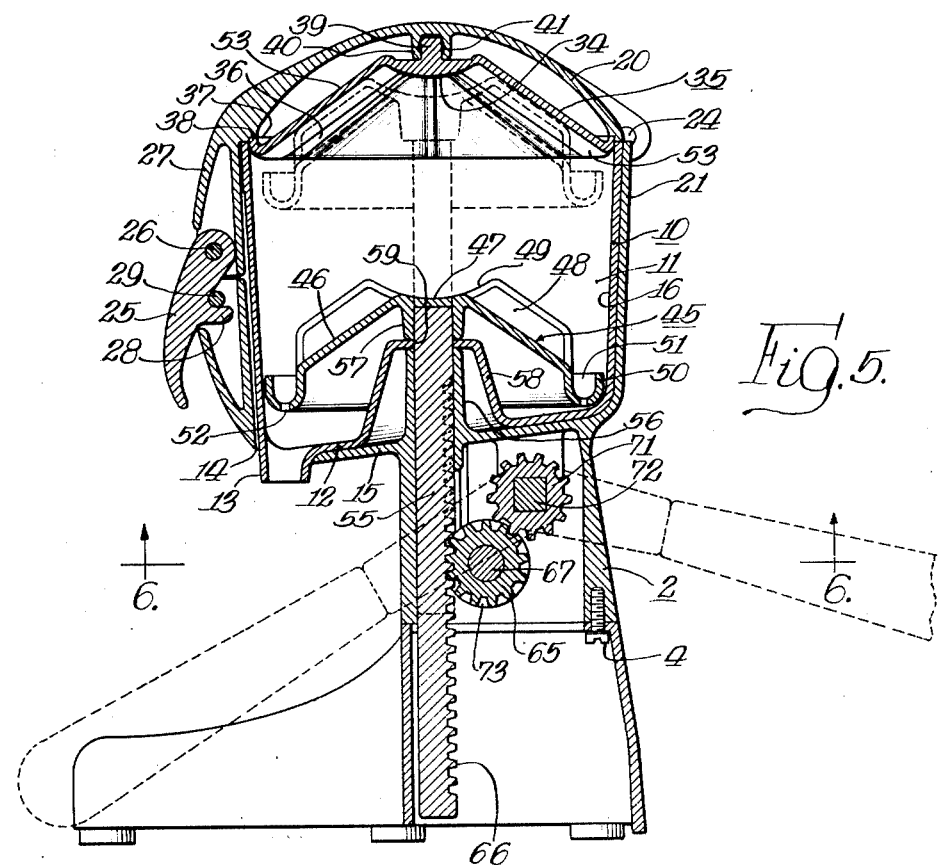
Fig. 5 is a view of a vertical section taken along line 5—5 of Fig. 3 and showing the squeezer members illustrated in Fig. 4.

Referring now particularly to Fig. 1 of the drawings, the juicer constructed in accordance with my invention includes a base 1, a supporting column or post 2 and a head 3 surmounting the pedestal, all of which members are made from a suitable material, preferably metal. Preferably, these members are made from a material which can be readily die-cast such as aluminum, zinc or known alloys. For ease in manufacture, the head 3 and post 2 are formed integrally and constitute a unitary body bracket and the base 1 preferably is formed as a separate member and is secured to the post 2 as by screws 4 (one of which is shown in Fig. 5). Both the base 1 and the post 2 are hollow and adapted to house actuating mechanism hereinafter described in detail; this construction also provides lightness and economy in material.

Figure 3:
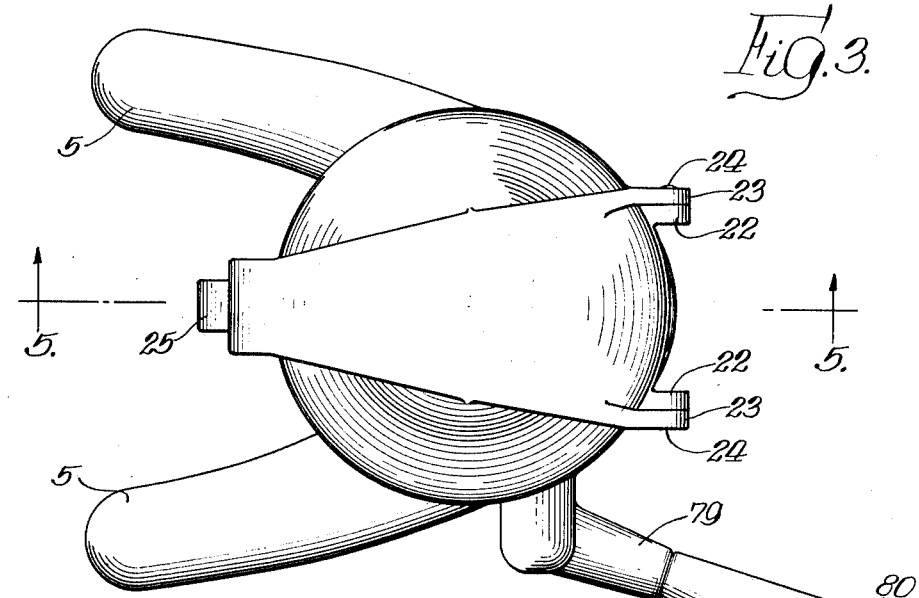
Fig. 3 is a top plan view of the device showing the cover or cap in closed position.
Figure 4:
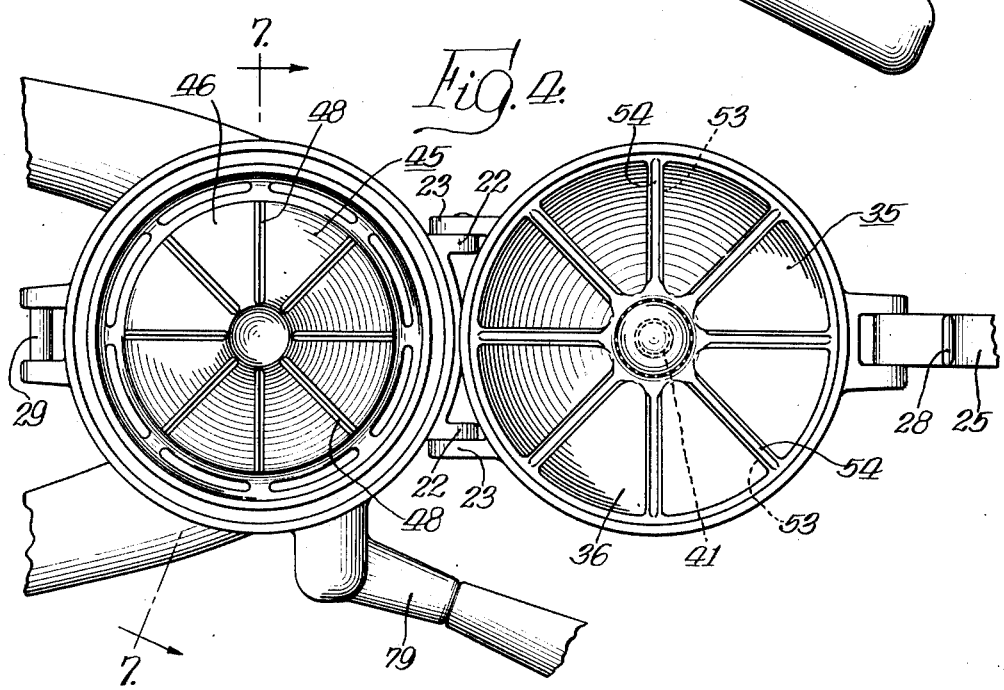
Fig. 4 is a fragmentary top plan view of the device with the cover or cap in open position and showing the cooperating portions of one form of upper and lower squeezer members.

The base 1 is formed with two forwardly extending, spaced feet 5 (Fig. 3) which provide a support of relatively wide extent and effectively oppose any overturning tendency normally developed during the actuation of the squeezing mechanism hereinafter described. The entire juicer is relatively low and thus has a relatively low center of gravity and, therefore, is not likely to be overturned accidentally.

The head 3 is formed with a socket portion 6 adapted to receive removably therein a juice bowl or cup 10 which defines an upwardly open squeezer chamber 11 (Figs. 5 and 12). The juice bowl 10 preferably is formed of a metal as, for example, aluminum and may be die-cast although, if desired, it may be formed of a plastic material.

Depending from the bottom wall 12 of the juice bowl 10 is an outlet spout 13 which permits juice to flow out of the juice bowl 10. The spout 13 seats in and extends through a suitably provided opening 14 at the bottom wall 15 of the socket 6. The bottom wall 12 of the juice bowl 10 is inclined downwardly from the rear toward the front so that juice will flow toward the spout 13 and drain from the bowl. The floor or bottom wall 15 of the socket 6 is correspondingly inclined whereby the bowl 10 seats snugly and firmly in the socket. The side wall 16 of the juice bowl 10 preferably converges slightly in a downward direction to permit ready removal of the bowl 10 from the head 3. While the outer surface of the side wall 16 may be plain and smooth, it may if desired, be formed with slight steps, as shown, or ridges, to facilitate ease in handling and prevent it from slipping out of the hands of the user as well as to provide a decorative effect.

In order to furnish a fixed abutment or backing against which the fruit may be squeezed, a pressure cap 20 is provided which is movable between a squeezing position extending across the open end of the juice bowl 10 and an open position permitting access to the squeezer chamber 11 for inserting a fruit therein and removing a squeezed skin and pulp therefrom. The cap 20, which may be formed by die casting, preferably is of generally circular dome-shaped form and is adapted, when in squeezing position, to overlie the lip of the cup and provide a completely sealed closure for the upper open end of the cup. The cap is pivotally connected to the upper end of a rear post 21 upstanding from the socket 6 and forming a portion of the head 3 by hinges formed by hinge brackets 22 at the upper end of the post 21 and corresponding brackets 23 on the cover and connected by hinge pins 24. The hinges are spaced apart a substantial distance and so located that their axis is in a vertical plane approximately tangent to the rim of the juice bowl. Thus when the cover is moved from closed position toward open position any juice which may have squirted or splashed against the inside of the cap will drain into the interior of the bowl and will not drip onto the hinges nor the outside of the juicer.

Means are provided for securely locking the pressure cap in position closing the upper end of the juice bowl whereby the cap is held firmly in position and serves as a rigid abutment against which a fruit may be squeezed. For this purpose a latch or trigger lock 25 is provided which is pivoted as by a pivot pin 26 to a tongue 27 depending from the forward rim of the pressure cap 20. The latch 25 which may be die-cast, is formed with a dog 28 adapted to engage a pin 29 carried in a front post 30 upstanding from the head 3 at the forward portion thereof. Both the tongue 27 and the post 30 are of hollow construction and are cut away at their forward portions to receive the pivoted portion of the latch 25 and the dog 28 respectively.

The latch 25 is so mounted and the dog 28 is so formed that when the pressure cap 20 is swung into closed position, the dog 28 tends to enter the post 30 and engage the pin 29 automatically. However, it may be caused to engage the pin 29 by slight manual pressure on its outer or free end. The dog 28 is so shaped that it holds the latch in engaged position until manually released. The latch 25 may be released and the cover moved to open position by simply rotating the latch 25 upwardly about its pivot; in effect this operation involves merely raising the latch 25, as will be apparent from inspection of the drawings particularly Fig. 5 thereof.

The cap 20 constitutes an upper squeezer member and for this purpose it may if desired be provided on its inner face with a squeezer surface. However, preferably the cap 20 carries detachably a squeezer element or pressure cone 35, one form 35 being shown in Figs. 4, 5, 7, 8 and 10. The pressure cone 35 which may be die-cast, is formed with a generally conical body 36 providing a downwardly concave wall or ceiling and with a center or hub 34 formed with a downwardly convex surface adapted to apply a squeezing pressure to the center of a fruit, as will hereinafter appear. Extending peripherally around the outer rim of the body 36 is an upturned flange or rim 37 adapted to seat against a shoulder 38 formed in the cap and provide a seal to prevent the entry of juices or other foreign matter between the pressure cone 35 and the pressure cap 20. The pressure cone 35 is detachably secured in the cap by a stud 39 which is received in a socket 40 formed in the cap 20 and held therein by a spring ring or snap clip 41 of generally barrel shape.

One form of lower squeezer member 45 (Figs. 4, 5, 7, 8 and 10), which also may be formed by die casting, which serves also as a fruit support, cutter and strainer, is mounted in the squeezer chamber 11 for movement toward and away from the pressure cone 35 in order to squeeze a fruit between these members. The lower squeezer member 45 is formed with a generally conical body 46 providing an upwardly convex floor complementary in shape to the upper wall 36 and with a center portion 47 upwardly concave and generally complementary in shape to the center 34 of the pressure cone 35.

The lower squeezer member 45 is provided with means for cutting the skin of a fruit during the initial portion of the movement of the squeezer member 45 toward the pressure cone 35 in order to permit juice to flow from the fruit at the start of the application of pressure as well as during entire pressure stroke of the lower squeezer member, thereby preventing the building up of a pressure within the fruit sufficient to cause bursting of the skin and thus minimizing the tendency of the pulp to be squeezed out of the skin. For this purpose the lower squeezer member 45 is provided with a plurality of knives or cutter blades 48 which project upwardly from the floor 46 and have sharpened outer edges. The blades 48 are arranged in a generally radial direction and their upper or cutting edges are generally parallel to the floor 46 and thus when the lower squeezer member 45 is moved toward the pressure cone 35 each blade 48 cuts into the skin of the fruit progressively in a radially outwardly direction. The inner end edges of the blades 48 are formed arcuately, as at 49, and provide with the convex surface 47 a seat for a fruit as illustrated somewhat diagrammatically in Fig. 7. The peak formed at the juncture of the arcuate and straight portion of the edge of each blade provides means for readily initiating the cutting action as will appear from an inspection of Figs. 7 and 8.

The pressure cone 35 is provided with a series of ribs 53 (Fig. 4) in the upper wall thereof which are disposed in a radial arrangement similarly to the blades 48 of the lower squeezer member and which provide grooves 54 into which the blades enter when the lower squeezer member 45 is moved upwardly toward the pressure cone. The grooves 54 are of such depth that the outer edges of the blades strike the bottom of the grooves and halt the movement of the lower squeezer member at a position wherein the floor 46 is spaced from the ceiling 36 (as illustrated in Figs. 5 and 10).

The lower squeezer member 45 has a reversely turned rim 50 extending peripherally around its outer edge which rim defines a trough 51 adapted to catch any seeds or pulp which may be expressed from the fruit. The rim 50 is formed with a plurality of spaced openings 52 preferably of elongated form which are of such width as to permit juice to pass freely therethrough and drop to the bottom of the bowl 10 but which prevent the passage of seeds or coarse particles of pulp. In order to permit free reciprocation of the lower squeezer member 45 at the juice bowl the rim 50 is spaced slightly from the side wall 16 of the juice bowl 10 but is sufficiently close to the wall to prevent any seeds or coarse pulp from dropping between the rim 50 and the adjacent side wall.

The lower squeezer member 45 is mounted for reciprocation in the chamber 11 by a rack 55 reciprocable in a guide 56 preferably formed integrally with the supporting column 2 and body bracket 3 and extending both above and below the floor 15 of the socket 6. Preferably the rack 55 and the guide 56 are of square or rectangular cross section to prevent the rack from turning in the guide. The lower squeezer member 45 is provided with a depending hub or socket 57 which receives the upper end of the rack 55 and supports the lower squeezer member non-rotatably on the rack 55. Preferably the lower squeezer member 45 is readily detachable from the rack 55 and accordingly the rack fits in the hub 57 only sufficiently tightly to prevent the upper squeezer member from rocking on the rack 55.

The floor 12 of the juice bowl is formed with an upstanding boss-like portion 58 having an opening 59 through which the rack 55 projects. The floor portion 58 extends upwardly over the portion of the guide 56 which projects above the socket floor 15 and snugly surrounds the rack 55 thereby providing a baffle for preventing the entry of fruit juices into the guide 56. Preferably the portion of the guide 56 which projects above the floor 15, and the floor portion 58 are of such heights that their upper ends are above the highest level to which fruit juice normally would rise in the juice bowl and there is little likelihood of the juice entering between the rim of the opening 59 and the rack 55. The floor 46 of the lower squeezer member is imperforate and thus forms an apron or baffle which prevents juice from dripping into the opening 59.

Figure 6:
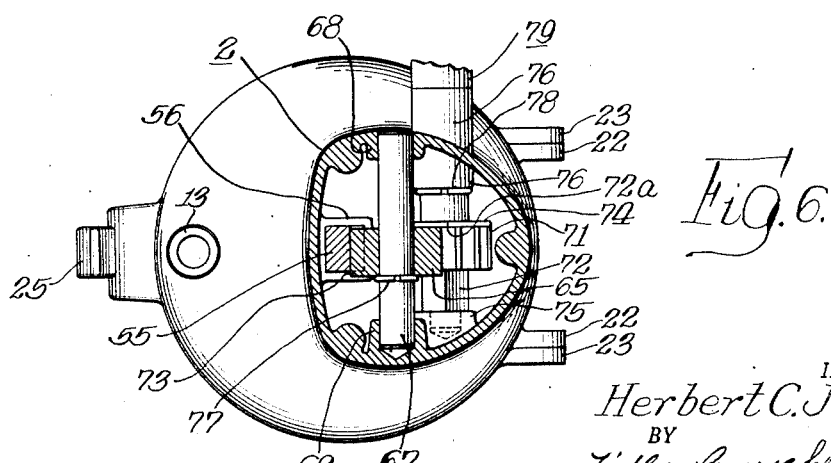
Fig. 6 is a view of a horizontal section taken along the line 6—6 of Fig. 5.

The rack 55 is reciprocated by a manually operated actuating mechanism substantially housed and concealed within the hollow supporting post 2. The actuating mechanism includes an idler gear 65 meshing with the teeth 66 of the rack and pivotally mounted on an idler shaft 67 secured in bosses 68 and 69 formed integrally with the column or post 2. The idler gear 65 is driven by a driving gear 71 rigidly mounted on a pinion shaft 72 journalled in bosses 75 and 76 preferably formed integrally with the supporting post 2, the latter boss preferably projects outside of the post 2 as shown particularly in Fig. 6. The idler gear 65 is held against longitudinal displacement on the shaft 67 by a web-portion 73 cooperating with the rack 55 and by a snap ring 77. The driving gear 71 is held against longitudinal displacement on the shaft 72 by a web-portion 74 cooperating with the idler gear 65 and by a shoulder 72a on the shaft 72. This arrangement provides a simple but effective construction for positioning the gears in proper operative relationship. A snap ring 78 on the shaft 72 serves to retain that shaft in its mounting in the bosses 75 and 76.

Firmly secured to the drive shaft 72 and abutting the external boss 76 is a lever 79, which may have a handle 80 attached thereto or integral therewith, by which lever the driving shaft 72 (and the mechanism associated therewith) may be actuated.

The gears 65 and 71 are so formed and mounted that the actuating mechanism effects a complete stroke of the rack when the lever is rotated through an angle of approximately 225°. The lever 79 is so arranged that in effecting this stroke it is rotated in a counterclockwise position (as viewed in Fig. 1) from a position extending rearwardly (full lines in Fig. 1), to a position extending forwardly (broken lines in Fig. 1). This operation provides a convenient and easy actuation of the mechanism and permits the application of sufficient force on the lever during the entire stroke, and particularly at the latter portion of the stroke, with the maximum of ease on the part of the operator. The stroke may be accomplished by a single easy movement of the hand and constitutes what I term a "single stroke" or "single action" operation. Since in this arrangement the lever 79 is rotated through an arc upwardly over its axis and is rotated through less than a full revolution, the lever may be substantially greater in length than the distance between the axis of rotation of the lever and the bottom of the base; thus, a relatively long lever may be used which permits operation of the juicer with the application of a relatively small force on the handle.

The driving gear 71 is mounted for rotation about an axis relatively close to the axis of reciprocation of the rack 55 and thus not only is a compact construction provided, but the bending stresses on the supporting structure are thereby minimized.

When the juicer is to be operated, the cap 20 is opened by lifting on the latch which causes the cap to pivot about its hinges to a position away from the upper end of the juice bowl thereby exposing the open end of the bowl. The whole fruit is inserted in the bowl and placed upon the seat provided by the concave surface 47 and the inner ends 49 of the blades 48, whereafter the cap is closed and the latch engaged to lock the cap secured in closed position. The lever 79 is rotated in a counterclockwise direction (as viewed in Fig. 1) from its rear toward its forward position thereby moving the lower squeezer member 45 from the position shown in full lines in Fig. 5 to the position shown in dotted lines.

Upon the application of sufficient pressure by the lower squeezer member against the fruit, the blades 48 cut the skin of the fruit along radial lines, the cutting action beginning at or adjacent the center of the fruit and extending progressively in outward directions. Depending upon the size of the particular fruit the cutting action may not be initiated until some upward movement of the squeezer member 45 has taken place. However, the cutting will occur as soon as moderate pressure is applied to the fruit and before substantial crushing, or any bursting of the fruit takes place. Accordingly, juice and the finer portions of the pulp are expressed through the cuts which are made in the lower surface of the fruit. Owing to the fact that the cutting takes place first on the lower side of the fruit the juice flows downwardly out of the fruit as soon as the skin has been cut and this action continues as pressure is further applied to the fruit.

As soon as the skin of the fruit is cut through by the cutting blades, juice begins to flow from the fruit and owing to the downwardly and outwardly inclined shape of the floor 46, the juice drains down into the trough 51 and thence through the openings 52 and into the juice bowl below the lower squeezer member 45. Owing to the inclination of the juice bowl floor 12 and the disposition of the outlet 13 at the lowest portion of this floor the juice drains rapidly out of the juicer and may be collected in a juice cup or other receptacle disposed under the outlet spout 13 in a manner which will be well understood. In this connection it will be noted that the feet 5 are sufficiently spaced apart to permit placing a receptacle of suitable size in a position under the outlet spout 13.

The seeds and coarser pulp elements are retained in the skin owing to the fact that the skin is cut along narrow lines and the cutting blades tend to seal the lines of cut sufficiently to prevent seeds or coarse pulp particles from being expressed from the skin. However, owing to the pressure exerted on the fruit the juice is forced readily out through the cuts made in the skin. In the event that any seeds or coarse pulp particles should be forced from the skin they are trapped by the rim 50 of the lower squeezer member 45 and do not pass from the juicer. The lower squeezer member may be removed readily after completion of the squeezing operation for disposing of the trapped seeds and coarse pulp particles.

Continued angular movement of the lever, after the initial cutting of the skin, effects continued upward movement of the lower squeezer member 45 and the application of squeezing pressure on the fruit which causes the fruit to be compacted in a vertical direction and causes juice to be forced from the fruit. As the fruit is compacted it tends to conform more or less to the shape of the floor 46 and the surface 36 as indicated very diagrammatically in Fig. 8 of the drawings. It will be understood, of course, that depending upon the shape of the fruit, the thickness and resilience of the skin and pulp and various other factors the exact shape assumed by the fruit will vary widely. However, it will be seen that the squeezer members exert pressure in the fruit over a wide area and as the squeezing progresses serve to force substantially all of the juice from the fruit. It also will be noted that the lower portion of the fruit is forced progressively over the cutting blades and the fruit is progressively cut substantially from the center to the outer edge. Still further movement of the lower squeezer member causes the fruit to be further compacted and the blades to cut into the fruit until the blades cut entirely through both the bottom and the top portions of the skin of the fruit and enter the grooves 54 in the pressure cone 35.

Upward movement of the lower squeezer member 45 is halted by the upper edges of the blades 48 striking against the upper portions of the grooves 54 and in this position the floor 46 is spaced from the wall 36 as illustrated very diagrammatically in Figs. 10 and 11. Thus, the operator is able to determine when the fruit has been entirely cut through and completely squeezed. Moreover, the floor 46 and wall 36 are spaced apart a sufficient distance so that the space therebetween accommodates the skin and squeezed pulp and the skin is not unduly compressed or crushed, thereby minimizing the expression of unpalatable constituents of the skin such as would result if the skin were very highly compressed.

The cutting of the skin in the initial stage of the squeezing operation permits substantially complete removal of the juice with the application of only moderate pressure on the fruit and thus the skin is not ruptured, bruised or compressed and a minimum of oils or other unpalatable materials are released from the skin. Owing to the fact that the cutting blades strike the bottom of the cooperating grooves in the upper squeezer member and serve to space the squeezer members at the end of the squeezing stroke, the final pressure which can be applied to the squeezed fruit is limited. Accordingly, it is practically impossible to compress the skin sufficiently to express any substantial quantity of unpalatable materials from the skin.

A second form of squeezing means is provided for the device and it is understood that the structural details already described apply equally well to the device when using this second form of squeezing means, except in the following particulars. Specifically, a detachable upper pressure member 81 (Figs. 12, 13, 14 and 15) is adapted to be supported in the cap 20. The pressure member 81 which may be formed by die casting has two similar flat pressure surface portions 82 and 83 which are substantially semicircular in shape and are similarly inclined upwardly relative to a horizontal plane of the device. Pressure portions 82 and 83 are joined medially transverse the pressure member 81 by an elongated and generally inverted U-shaped portion 84, the top wall 85 of which substantially conforms with the inner radius of curvature of the cap 20. In this manner, an elongated channel 86 is formed between the similar pressure surface portions 82 and 83 which extends medially transverse the cap 20 and has a depth determined by the radius of curvature of the wall 85. A flange-like rim portion 87 encircles the pressure member 81 and is in depending relation with the cap 20 so that when the cap is in closed position, the flange-like portion will be snugly received in the top of the juice bowl 10 to provide a seal between the pressure member and juice bowl.

A second form of lower squeezer member 88 which is adapted to cooperate with the upper squeezer member 81 is removably supported on the top of rack 55 for movement therewith toward and away from the upper squeezer member during movement of the handle 80. A depending hub or socket 89 maintains the lower pressure member 88 in proper angular position on the top of the rack 55; however, it should be noted that the length of the hub 89 is such that when the rack 55 is in its lowermost position, the hub will limit on the floor portion 58 of the juice cup so that the top of the rack 55 will be removed slightly from its innermost position in the hub 89 providing a spaced relation of the top end of the rack 55 with the end wall of the socket in the hub 89. Downward movement of the rack 55 is limited by engagement between an appropriate one of the teeth of the gear 65 and the untoothed portion of the rack 55 just above the series of rack teeth. The construction is such that a slight movement of the handle 80 is necessary before the rack 55 is effective to move the lower squeezer member 87 upwardly. Likewise, during the return movement of the handle 80, the lower squeezer member 88 will be limited in its downward movement before the handle 80 has completed its return movement. This construction is effective to partially disengage the rack 55 from the socket or hub 89 to eliminate any tendency of a lower pressure member to lock on the rack 55 and interfere with the ease of removal of the lower pressure member when it is desired to clean the device.

A skirt-like portion 90 projects downwardly from the lower squeezer member 88 and is radially removed from the walls of hub 89 a sufficient extent so that it is positioned outwardly of the bottom wall portion 58 of the juice cup. In this position it serves as an arresting baffle for any juice that may tend to follow the lower contour of the pressure member 88.

Lower squeezer member 88 is provided with an elongated cutting blade 91 having similar depending lug portions 92 adjacent each end thereof which are snugly received in slot-like openings 93 in the squeezer member 88 whereby the blade is made substantially integral with the squeezer member and is supported in upright position in alignment for registration with the channel 86 in the upper pressure member 81. The upper edge of the blade 91 has a series of cutting edges 94, each of which is in inclined relation with a horizontal plane through the device to allow them more readily to penetrate the rind of a fruit from which it is desired to extract its juices. It will be noted that several of the cutting edges 94 are arranged to terminate in pointed portions 95, 96 and 97 whereby a fruit may be impinged on the blade 91 with a minimum of effort preparatory to expressing the juice therefrom.

Lower squeezer member 88 has two generally semicircular flat floor portions 98 and 99 disposed on opposite sides of the blade 91 which act as pressure surfaces and cooperate with the respective pressure surfaces 82 and 83 of the upper squeezer member to force or express the juice through the cut portion of the fruit during operation of the device. Each flat floor portion 98 and 99 is similarly inclined upwardly at the same angle of inclination provided for the upper pressure surfaces 82 and 83, whereby the cooperating pressure surfaces and floor portions are parallelly related throughout the range of movement of the lower squeezer member 88. This relationship is illustrated in Fig. 15 wherein the upper and lower squeezer members are shown in close association one with the other at the approximate end of a pressure stroke. Intermediate the flat surfaces 98 and 99 and on each side of the blade 91 juice channels 100 are provided which originate at a centrally located raised or embossed portion 101 of the floor and which extend outwardly and downwardly of squeezer member 88 where they terminate adjacent the periphery of the squeezer member and join with depressed cup-like portions 102. The cup portions 102 have a series of openings 103 of sufficient size to readily allow the passage of juice therethrough and to withhold any seeds or pulp that may find their way into the strainer cups. The lower squeezer member 88 therefore not only cuts the fruit and supports the fruit during the juice expressing operation but also acts as a strainer so that if any seeds or pulp are squeezed from the fruit they will be retained in the strainer cup 102. This is particularly important when squeezing or expressing the juice from other than a whole fruit as will be readily understood.

The squeezer members 81 and 88 are especially efficient in expressing the juices from a whole fruit without extracting the bitter oils from the fruit rind. When a whole fruit is impinged on the points 95, 96 and 97 and the handle 80 is moved in a juice extracting direction, the top of the fruit is moved into contact with the upper squeezer member 81, whereby its free upward movement is arrested. The blade 91 then enters the fruit providing a clean cut transversely of its bottom side prior to the application of the juice expressing pressure on the fruit so that the rind will be open and the fruit will not be subjected to a bursting pressure. Continued movement of the handle 80 causes the fruit to be squeezed between the squeezer members and because of the cut previously made along the bottom of the fruit by the blade 91, the bottom of the fruit tends to move slightly outwardly from each side of the blade and provides an opening therealong through which the juice may flow from the fruit and into the juice channels 100. It will be noted that the juice channels 100 space the pressure surfaces 98 and 99 from the blade 91. This construction not only provides a means for conducting the extracted juice to the strainer cups 102 but also insures that the squeezing pressure will not be applied immediately adjacent the cut edge of the fruit. In this manner, the lower cut edges of the fruit remain in open communication with the juice channels 100 notwithstanding the fact that the lower squeezer member 88 may be moved to its uppermost position during the squeezing operation. Another important feature of the squeezer members 81 and 88 is the parellel relation of the pressure surface 83 with the surface 99 and the pressure surface 82 with the surface 98. By parallelly relating these surfaces, there is no tendency to pinch or apply unequal pressures to the rind which might tend to extract the oil therefrom or trap the juice in the fruit. Further, by inclining the floor surfaces 98 and 99 upwardly and outwardly the fruit is forced into a similarly inclined position and the juice will not be trapped in the fruit as it will be free to flow from the fruit and into the juice channels 100 by the action of gravity as well as by the force of the expressing pressure on the fruit. During the juice expressing operation, cutting blade 91 seals the cut portion of the fruit to an extent to substantially retain the seeds and pulp within the fruit without interfering with the free removal and flow of the juice therefrom.

Another embodiment of my invention is shown in Figs. 16 to 19 and is similar in many respects to the devices hereinbefore described. Accordingly, those portions of the device differing from the previously described structures will be described in detail, it being understood that reference may be made to the previously described devices for structural details of similar and corresponding parts.

Referring now porticularly to Fig. 16, the device is provided with a removably supported juice bowl 105 which may be formed of metal or plastic which is inert in the presence of the juices of fruits that may be squeezed in the device. Juice bowl 105 is formed with an annular shoulder 106 on its upstanding central portion 107 and serves to removably support a juice strainer cup 108 adjacent the bottom of the juice bowl. The strainer cup 108 has a diameter of an extent to substantially conform with the inside bottom diameter of the juice bowl 105 and is provided with a flange-like annular portion 109 which is conveniently disposed to enable the user of the device to easily grasp the strainer cup and remove it from the juice bowl for purposes of cleaning the bottom of the juice bowl and the strainer cup. The bottom of the strainer cup 108 is perforated to form a plurality of openings 110 which are spaced completely around the bottom of the cup. These openings are of a size to readily pass the juice that is extracted from the fruit so that the expresseed juice may flow from the juice bowl spout 105a and the pulp and seeds will be retained within the strainer cup.

The device is provided with a lower pressure means which normally is positioned directly above the strainer cup 108 and which is adapted upon actuation of the handle 80 in juice expressing direction to be moved upwardly into squeezing relation with an upper squeezing means to be later described. The lower squeezing means comprises a removable pressure member 111 having a centrally disposed and generally cylindrically shaped depending stem portion 112 which is adapted to be received in an axially disposed bore 113 in the top of an actuating rack member 114. The depending stem 112 has a pair of radially extending and oppositely disposed lug portions 115 adapted to register with correspondingly shaped openings in the top of the rack 114 whereby the lower pressure member 111 is supported by the rack in keyed non-pivotal fashion thereon. This construction permits the lower squeezer member 111 to be readily removed from the device for purposes of cleaning and insures that when it is replaced on the rack 114 it will be in the proper axial angular relation with the device.

A cutting means comprising an upstanding blade 116 is carried by the lower pressure member 111 and is made substantially integral therewith by means of a pair of depending lug portions 117 (Fig. 18) which are snugly received in slotted ears 118 projecting upwardly from the top surface of the lower pressure member 111. The blade 116 has a length less than the diameter of the lower pressure member 111 and is notched medially along its lower edge for receiving a generally circular shaped floor portion 119 disposed medially of the lower pressure member 111 and which, during the juice expressing operation, acts as a baffle to divert the juice flow radially outwardly in opposite directions along outwardly and downwardly inclined juice channels 120. The floor of the pressure member 111 also has two similar and oppositely disposed flat pressure faces 121 and 122, each of which is generally semicircular in shape and is inclined upwardly and outwardly from the respective longitudinal top edges of the juice channels 120 and the opposite arcuate sides of the floor portion 119. Thus, the pressure faces 121 and 122, when viewed in vertical cross section (Figs. 16 and 19), will be seen to be in substantially a wide V relation so that any juice that is discharged on either of the pressure faces will flow under the urge of gravity into the channels 120 and be discharged from the outer ends thereof into the strainer cup 108.

An upper pressure member 123, preferably formed by die casting, is provided for the device and has a pair of oppositely disposed, flat pressure faces 124 and 125 adapted to cooperate with the respective lower pressure faces 121 and 122 during a juice expressing operation. The pressure faces 124 and 125 are generally semicircular in shape and are inclined upwardly and outwardly from an upstanding rib portion 126 of the upper pressure member so that they are in parallel relation with the lower pressure faces 121 and 122 with which they cooperate in expressing the juice from a fruit that may be positioned therebetween. The rib portion 126 extends medially and transversely of the upper pressure member and has a longitudinally disposed slot 127, arranged vertically in the rib portion 126 and having a length and width of an extent only to receive the cutting blade 116 and the upstanding ears 118 when the lower pressure member 111 is in proximate relation with the upper pressure member. Hence, portions of the fruit cannot be pressed into or become lodged in the slot 127 and cleaning of the upper pressure member 123 is simplified. The upper pressure member 123 further is provided with a pair of oppositely disposed shoulder portions 128 (Figs. 16 and 17) which are adapted to be engaged by the uppermost edges of the lower pressure faces 121 and 122 to limit the upward movement of the lower pressure member 111 short of engagement of the cutting edges of the blade 116 with the top wall of the slot 127 in the upper pressure member.

The operation and use of the embodiment of my invention illustrated in Fig. 16 is very similar to the operation and use of the previously described embodiment of my invention illustrated in Fig. 12. Generally, when a fruit is impinged on the cutting edge of the blade 116 and the cover 20 of the device is placed in closed position, the handle 80 may be moved with a single stroke in squeezing direction to express the juice from the fruit. The movement of the handle causes the rack 114 and the lower pressure member 111 to move upwardly whereby the top of the fruit is brought into contact with the upper pressure member 123; and, upon continued movement of the handle, the blade 116 cleanly cuts the fruit along its lower side as the blade enters the fruit to provide an opening therein through which the juice may be expressed. When the blade 116 has fully entered the fruit, the fruit then rests upon the lower pressure faces 121 and 122 and is forced against the upper pressure faces 124 and 125 and is squeezed therebetween so that the rind on the top and bottom sides of each half of the fruit is maintained in substantially parallel relation during the juice expressing operation. Also, the portions of the fruit disposed on each side of the cutting blade 116 conform with the angular relation of the respective pressure faces engaged therewith so that the portions of the fruit are held in similarly inclined planes allowing the juice to flow from the fruit by the action of gravity as well as by the juice expressing pressure so that at no time is any juice trapped in the fruit which might result in explosive pressure developed within the fruit tending to rupture the rind and release the bitter oils therefrom.

The flow of the expressed juice from the fruit follows the inclined pressure faces 121 and 122 to the transverse center of the lower pressure member 111 where the juice flow is divided at the center of the lower pressure member by the floor portion 119. From the floor portion 119, the juice flows in opposite directions in the downwardly inclined juice channels 120 to be discharged from the ends thereof into the strainer cup 108. Any pulp or seeds that are squeezed from the fruit and thereafter are carried by the juice along the channels 120 and into the strainer cup 108 will be retained therein by the straining action provided by the plurality of openings 110 in the bottom of the strainer cup. As the strained juice drops from the bottom of the strainer cup 108, it flows along the inclined bottom of the juice bowl 105 and is discharged through the spout 105a into any suitable receptacle (not shown) that may be placed below the spout.

When my device is used with any of the described forms of cooperating pressure members, the cutting of the skin prior to the application of substantial pressure on the fruit eliminates the necessity for building up a sufficient pressure within the fruit to burst the skin before juice is expressed. Thus, rupture or bursting of the skin is prevented as is consequent expression of pulp or seeds. Moreover, the elimination of any substantial crushing of the skin of the fruit minimizes the amount of bitter oils or other unpalatable constituents of the skin which might otherwise be forced from the skin by the squeezing operation.

The progressive cutting of the skin and the release of pressure within the fruit which would otherwise be offered by the skin if the fruit were squeezed without cutting of the skin permits the squeezing to take place rapidly and without the necessity for the application of undue force on the actuating lever.

From the foregoing it will be seen that my invention provides a whole fruit juicer wherein the skin of the fruit is cut at the beginning of the squeezing operation, thus permitting the juice to flow from the fruit before any substantial pressure is applied to the fruit. Thus, the building up of excessive pressure within the fruit is prevented and the consequent bursting of the skin and release of pulp is avoided. Since the skin is cut along narrow lines and is not ruptured, the pulp and seeds tend to remain in the fruit. Moreover, since the skin is cut first at the bottom of the fruit, the juice can pass rapidly out of the fruit by gravity.

The juicer may be operated with a relatively small force applied to the handle since the skin is cut at the beginning of the squeezing operation and thus it is not necessary to apply sufficient pressure to burst the skin. Moreover, the operating handle is so arranged that a relatively long handle, providing a long lever arm, may be employed. The mechanism connecting the handle and the movable squeezer member permits a complete stroke of the squeezer to be effected upon movement of the handle through less than a single complete revolution thereby providing a "single stroke operation."

Since the cap, when in open position, is disposed entirely away from its closed position over the lower squeezer member, the latter is readily accessible for the disposition thereon of whole fruit and removal therefrom of the residue from squeezed fruit. Moreover, this feature permits the cap and lower squeezer member to be positioned apart, when at the beginning of a squeezing stroke, a distance not substantially greater than the diameter of the largest fruit to be squeezed. Thus, the squeezing action can be accomplished with a relatively short stroke of the lower squeezer member.

The squeezing chamber formed by the cup and the cap is completely closed (except for the opening in the outlet spout) and is sealed by the engagement between the rim of the cap and the lip of the cup. Thus no juices can squirt out of or leak from the chamber and soil the outside of the juicer or any objects adjacent the juicer. The juicer can easily be kept clean and sanitary by reason of the simplicity of the parts and the removability of those elements which are subject to normal contact with fruit juices. The lower squeezer members and cup can be readily removed by merely lifting them from their respective positions in the cup. The upper squeezer member may be cleaned while the cap is in open position or, if more thorough cleaning is desired, may be detached from the cap. The other portions of the juicer will not normally be soiled by squirting juice. It will be noted, in this connection, that all of the elements of the drive mechanism (except for the handle) are enclosed in the body. The central portion of the floor of the lower squeezer member is imperforate and therefore, with the socket forms a shield which prevents the entry of juice into the rack guide. It will be noted, also, that the central upstanding portion of the cup floor extends upwardly a substantial distance, thereby preventing any juice or pulp which may collect in the bottom of the cup from reaching the opening in the cup and entering the guide. The hinges for the cap are so arranged that when the cap is moved between open and closed positions any juice which may drain from the upper squeezer member will not fall on the hinges.

Normally, the drive mechanism will not need to be disassembled as it is simple, rugged and well protected, and under all conditions of normal use should last almost indefinitely without repair, adjustment or replacement. However, it will be seen that its simplicity of construction makes it not only easy to construct and assemble but likewise easy to disassemble, in the event such should become necessary.

I claim:

1. A fruit juicer comprising a hollow post, a body having a socket, said body being mounted on said post and having a floor formed with a first and centrally disposed opening and a second opening, a juice bowl removably disposed in said socket and having an inclined floor formed with an opening registering with the first opening in said socket floor and a discharge spout extending through said second opening, a supporting member reciprocable in said hollow post and projecting through the registering openings in said socket and bowl, an upper squeezer member having a squeezer surface in said juice bowl, a lower squeezer member in said bowl and supported on said supporting member, driving mechanism housed substantially in said post for reciprocating said supporting member, and an actuating handle externally of said post and connected to said driving mechanism.

2. A whole fruit juicer comprising an upwardly open casing, an upper squeezer member movable into closed position closing said casing and having an elongated closed-top channel portion disposed medially and transversely thereof, and a flat pressure surface portion adjacent each longitudinal side of said channel portion, each said pressure surface portion extending outwardly and upwardly relative to said channel portion, a lower squeezer member having an elongated cutting blade upstanding therefrom and positioned to enter said channel portion when said squeezer members are moved into squeezing relation, and a flat floor portion disposed adjacent each side of said cutting blade and complementally shaped relatively to the corresponding surfaces of said upper squeezer member, each of said floor portions extending outwardly and upwardly relative to said cutting blade and substantially parallel to said pressure surface, means mounting said squeezer members in opposed relation, and means for moving said lower squeezer member into squeezing relation with said upper squeezer member to cause said cutting blade to cut the skin of a fruit disposed between said squeezer members and to squeeze the fruit between said pressure surface portions and said floor portions.

3. A whole fruit juicer comprising a casing defining a chamber, an upper squeezer member having a pair of flat squeezer surfaces in said chamber, each of said squeezer surfaces being generally semicircular in shape, a lower squeezer member in said chamber and having a pair of flat floor portions generally semicircular in shape, there being juice channel portions disposed transversely of said lower squeezer member and between said floor portions, said channel portions extending radially and downwardly of said lower squeezer member, cup-like juice strainer means disposed below the level of and outwardly beyond the outer ends of said channel portions, and an elongated, upstanding cutting blade disposed intermediate said floor portions, and means for moving said lower squeezer member into squeezing relation with said upper squeezer member to cause said blade to cut the skin of a fruit disposed between said squeezer members and to squeeze the fruit between said squeezer surfaces and said floor portions, whereby the juice will be expressed from the fruit and flow through said channel portions and be strained by said cup-like strainer portions.

4. A whole fruit juicer comprising an upper squeezer member having an elongated channel portion disposed medially and transversely thereof, a lower squeezer member mounted in opposed relation to said upper squeezer member for vertical movement towards and away from said upper squeezer member, and means for imparting upward movement to said lower squeezer member, said lower squeezer member having a pair of flat floor portions generally semicircular in shape with the arcuate portions of said floor portions disposed in diametrically opposed relation, said floor portions being inclined upwardly and outwardly from their respective chordal portions, generally linear juice channel portions disposed between and below the chordal portions of said floor portions and extending outwardly and downwardly from adjacent the center of said lower squeezer member to adjacent the periphery thereof, and an upstanding elongated blade portion in registration with said juice channel portions and disposed for engagement with the channel portions in said upper squeezer member when said lower member is proximate thereto, whereby when a fruit is placed between said squeezer members and said lower squeezer member is moved upwardly by said moving means, the fruit will first be cut along its lower side by said blade portion and then will be squeezed between said flat floor portions and said upper squeezer member, and the juice expressed therefrom will be conducted through said juice channel portions to the periphery of said lower squeeze member.

5. A whole fruit juicer comprising a cupped casing defining a chamber, a cover movable into position to close said casing, an upper squeezer member carried by said cover and having a pair of flat squeezer surfaces in said chamber, said squeezer surfaces being generally semicircular in shape and each being inclined at an acute angle with and on opposite sides of a vertical plane through the axis of said upper squeezer member, a lower squeezer member in said chamber and having a pair of flat floor portions generally semicircular in shape, said floor portions being respectively disposed parallel with the respective said squeezer surfaces, an elongated, upstanding cutting blade mounted on said lower squeezer member intermediate said floor portions, said lower squeezer member being mounted for movement in said chamber into squeezing relation with the upper squeezer member, and means operable independently of said cover for moving said lower squeezer member to cause said blade to cut the skin of a fruit disposed between said squeezer members and to squeeze the fruit between said squeezer surfaces and said floor portions, whereby the juice expressed from the fruit is caused to flow along said cutting blade.

6. A whole fruit juicer comprising means defining a substantially closed chamber, a first squeezer member having an upstanding, elongate cutting blade supported thereon, and a flat imperforate squeezer face disposed to one side of said blade at an acute angle therewith, a second squeezer member having a transverse groove therein to freely receive said blade when said squeezer members are moved into proximate relation, and a flat imperforate pressure face disposed to one side of said groove and in parallel relation with said squeezer face on said first squeezer member, a separate juice strainer of perforated generally cupped form and removably supported in the bottom of said chamber under said lower squeezer member and extending outwardly beyond said lower squeezer member, means mounting said squeezer members in said chamber above said strainer and with said squeezer face and said pressure face in opposed relation, and means including an actuating element extending outwardly through said strainer and engaging said lower squeezer member for effecting movement of one of said squeezer members into proximate and squeezing relation to said other squeezer member to first cause said blade to cut the rind of a fruit disposed between said squeezer members and then to squeeze the fruit between said squeezer face and said pressure face.

7. A whole fruit juicer comprising a support, an upwardly open casing mounted on said support, a cover mounted for movement between open position permitting insertion of a fruit into said casing and closed position sealingly closing the upper end of said casing, means for securing said cover in closed position, a lower squeezer member in said casing having an inperforate floor portion, a cutter blade upstanding from said floor portion and a perforate strainer disposed below the level of and extending outwardly beyond the periphery of said floor portion, an upper squeezer member carried by said cover for movement into squeezing position when said cover is closed and having a groove positioned to receive said cutter blade when said cover is closed and said lower squeezer member is moved into squeezing position, and means operable independently of the position of said cover for moving sair lower squeezer member between a lower position and an upper squeezing position closer to said upper squeezer member.

8. A whole fruit juicer comprising a casing defining a chamber, a cover movable on said casing between open and closed positions and having an upper squeezer element adapted to close the top of said chamber when said cover is in closed position, a lower squeezer member removably disposed in said chamber and having a floor portion of lesser diameter than said chamber and complemental in shape to said upper squeezer element, and a cutting blade upstanding from said floor portion, means for moving said lower squeezer member toward said upper squeezer element to cause said blade to cut the skin of a fruit in the said chamber and to squeeze the fruit between said lower squeezer member and said upper squeezer element, said last means including a reciprocally movable actuating element extending into said chamber and engaging the under side of said lower squeezer member, and a perforated cup-like member removably disposed in said chamber between said lower squeezer member and the bottom of said chamber and extending outwardly beyond the periphery of said lower squeezer member, and having a central opening through which said actuating element extends.

9. A whole fruit juicer comprising a base, an upwardly opening socket mounted on said base, spaced posts projecting upwardly from said socket at diametrically opposite portions thereof, an upwardly opening juice bowl disposed in said socket and projecting thereabove, a cover pivoted to one of said posts for movement between open position and closed position substantially closing said bowl and retaining the latter in said socket, a tongue projecting downwardly from said cover, cooperating latch elements on said tongue and the other of said posts for latching said cover in closed position, a squeezer surface carried by said cover, a lower squeezer member in said bowl, means mounting said squeezer member for movement into squeezing relation with said squeezer surface, and means including a handle for moving said lower squeezer member into and out of squeezing relation with said squeezer surface.

10. The invention as set forth in claim 1 wherein strainer means are provided including strainer portions formed integrally with said lower squeezer member at diametrically opposite portions of the periphery thereof.

References Cited in the file of this patent

UNITED STATES PATENTS

| 64,630 | Cassidey | May 14, 1867 |
| 172,505 | Sammis | Jan. 8, 1876 |
| 434,327 | Dunlap | Aug. 12, 1890 |
| 464,954 | Brown | Dec. 15, 1891 |
| 468,341 | Harris | Feb. 9, 1892 |
| 473,043 | Williams | Apr. 19, 1892 |
| 722,898 | Redlinger | Mar. 17, 1903 |
| 1,117,122 | Williams | Nov. 10, 1914 |
| 1,341,496 | Creasey | May 25, 1920 |
| 1,465,558 | Pickop | Aug. 21, 1923 |
| 1,686,096 | Manning | Oct. 2, 1928 |
| 1,938,463 | Robetts | Dec. 5, 1933 |

(Other references on following page)

UNITED STATES PATENTS

| | | | |
|---|---|---|---|
| 1,944,904 | Read | Jan. 30, | 1934 |
| 2,010,629 | Fageol | Aug. 6, | 1935 |
| 2,010,630 | Fageol | Aug. 6, | 1935 |
| 2,022,206 | Kammer | Nov. 26, | 1935 |
| 2,067,555 | Walker | Jan. 12, | 1937 |
| 2,081,424 | Daum | May 25, | 1937 |
| 2,117,496 | Osuch | May 17, | 1938 |
| 2,142,975 | Majewski | Jan. 3, | 1939 |
| 2,168,430 | Myers | Aug. 8, | 1939 |
| 2,174,909 | McCullough | Oct. 3, | 1939 |
| 2,404,382 | Klein | July 23, | 1946 |
| 2,414,053 | McCarthy | Jan. 7, | 1947 |
| 2,534,554 | Kahre | Dec. 19, | 1950 |

FOREIGN PATENTS

| | | | |
|---|---|---|---|
| 663,189 | Germany | July 30, | 1938 |